United States Patent
Ishizuka

(10) Patent No.: US 7,520,265 B2
(45) Date of Patent: Apr. 21, 2009

(54) FUEL INJECTION CONTROLLER

(75) Inventor: Koji Ishizuka, Kariya (JP)

(73) Assignee: Denso Corporation, Kariya (JP)

( * ) Notice: Subject to any disclaimer, the term of this patent is extended or adjusted under 35 U.S.C. 154(b) by 298 days.

(21) Appl. No.: 11/653,850

(22) Filed: Jan. 17, 2007

(65) Prior Publication Data

US 2007/0175446 A1    Aug. 2, 2007

(30) Foreign Application Priority Data

Feb. 2, 2006    (JP) .............................. 2006-026165

(51) Int. Cl.
*F02M 7/00* (2006.01)
*F02D 41/00* (2006.01)

(52) U.S. Cl. ..................... 123/435; 123/673; 123/674

(58) Field of Classification Search .................. 123/435, 123/434, 673, 490, 299, 447, 674

See application file for complete search history.

(56) References Cited

U.S. PATENT DOCUMENTS

| | | | |
|---|---|---|---|
| 6,101,998 A * | 8/2000 | Tamura et al. ............... | 123/295 |
| 6,722,345 B2 | 4/2004 | Saeki et al. | |
| 7,343,240 B2 * | 3/2008 | Sugiyama et al. ........... | 701/104 |
| 7,392,129 B2 * | 6/2008 | Hill et al. .................... | 701/105 |

* cited by examiner

*Primary Examiner*—John T Kwon
(74) *Attorney, Agent, or Firm*—Nixon & Vanderhye, PC

(57) ABSTRACT

A fuel injection device calculates a variation correction value by incorporating in-cylinder pressure into injector individual data based on an injection rate of an injector measured outside a cylinder of an engine. The fuel injection device corrects a target injection amount and generation timing of a command signal of the injector based on the variation correction value. Thus, accurate injection characteristics substantially conforming to designed median values can be obtained inside the cylinder, and highly accurate injection control can be performed. Thus, the fuel injection device can perform accurate multi-injection, which requires extremely high accuracy, to simultaneously achieve reduction of engine vibration and engine noise, purification of exhaust gas and improvement of engine output and fuel consumption at high levels.

10 Claims, 11 Drawing Sheets

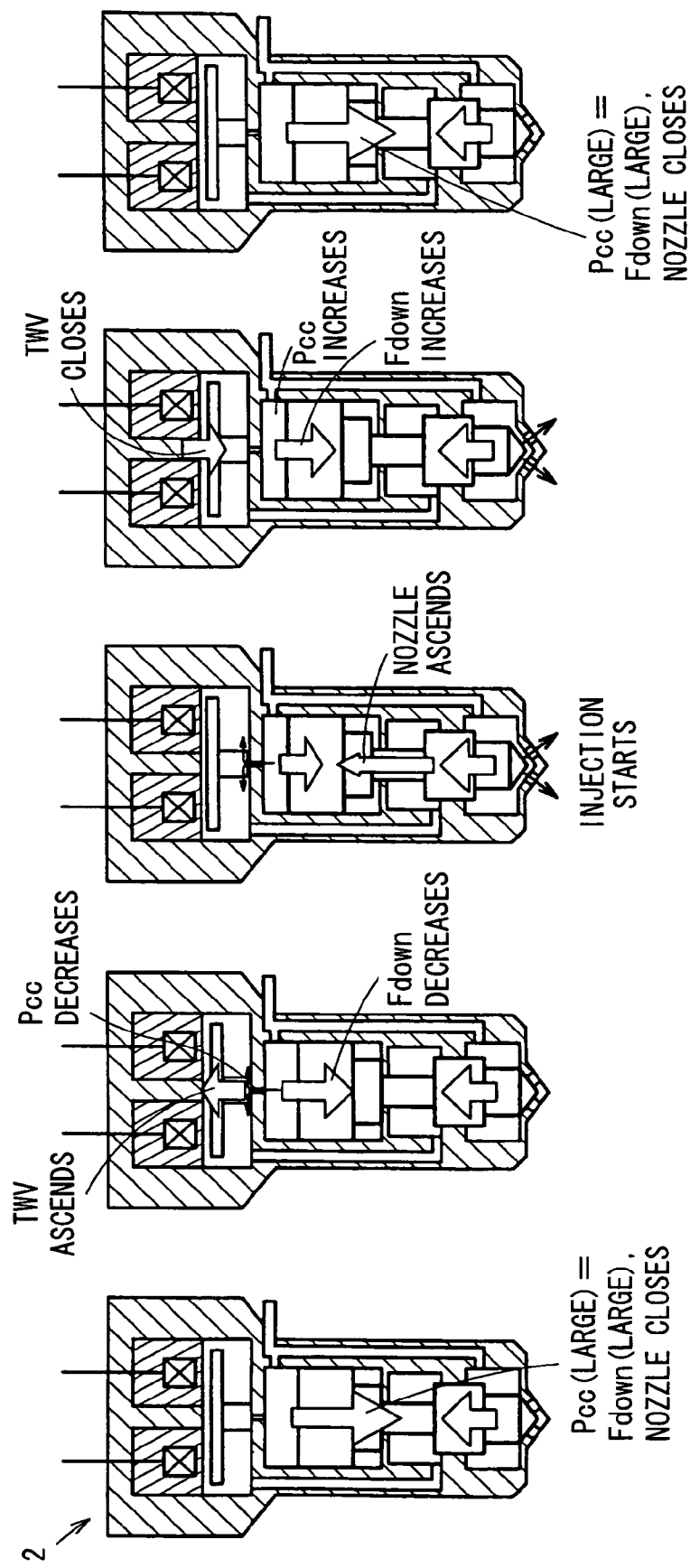

OUTSIDE CYLINDER

INSIDE CYLINDER

FUEL INJECTION CONTROLLER

CROSS REFERENCE TO RELATED APPLICATION

This application is based on and incorporates herein by reference Japanese Patent Application No. 2006-26165 filed on Feb. 2, 2006.

BACKGROUND OF THE INVENTION

1. Field of the Invention

The present invention relates to a fuel injection device for injecting fuel into an internal combustion engine. In particular, the present invention relates to a technology of correcting variation in an injector.

2. Description of Related Art

There is an injector attached with a code table, which stores injector individual data based on an injection rate of the injector measured outside a cylinder of an engine when the injector is shipped. For example, injection start delay Td, injection end delay Te and several injection amounts Q are measured outside the cylinder of the engine when the injector is shipped. Then, variations from designed median values are converted into energization periods or the like and are stored in the code table such as a QR code. The code table is attached to the injector.

A vehicle, in which the injector is mounted, reads the injector individual data of the injector from the code table attached to the injector and stores the injector individual data into a controller. The controller has a correcting device for performing variation correction of the injector based on the stored injector individual data. The correcting device corrects a control parameter corresponding to an engine operation state based on the injector individual data to bring injection characteristics of the injector to the designed median values, more specifically, to the designed median values give or take appropriate variations (for example, as described in JP-A-2003-227393).

In recent years, in order to simultaneously achieve reduction of engine vibration and engine noise, purification of exhaust gas and improvement of engine output and fuel consumption at high levels, highly accurate injection control has been required. Specifically, extremely accurate injection control is required for multi-injection performing multiple fuel injections during one cycle. Therefore, the variation correction is performed to correct the injection variation of the injector. However, it has been difficult to obtain the accurate injection characteristics substantially conforming to the deigned median values in a state in which the injector is actually mounted in the engine.

The inventor discovered that tendency of the variation differs between an outside and an inside of the cylinder. That is, the correction becomes excessive inside the cylinder due to in-cylinder pressure Pcyl if a variation correction value is calculated directly from the injector individual data obtained outside the cylinder. In such a case, there is a possibility that the injection characteristics deviate from the designed median values.

SUMMARY OF THE INVENTION

It is an object of the present invention to provide a fuel injection device capable of obtaining accurate injection characteristics substantially conforming to designed median values inside a cylinder even if variation data of an injector are measured outside the cylinder.

According to an aspect of the present invention, a correcting device of a fuel injection device performs variation correction of an injector by incorporating in-cylinder pressure into injector individual data obtained through measurement performed outside a cylinder. Accordingly, accurate injection characteristics substantially conforming to designed median values can be obtained inside the cylinder. Thus, even if the variation data of the injector are measured outside the cylinder, the accurate injection characteristics substantially conforming to the designed median values can be obtained even inside the cylinder. As a result, highly accurate injection control can be performed.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

FIGS. 4A to 4E are diagrams showing an operation of the injector according to the FIG. 1 embodiment;

DETAILED DESCRIPTION OF EXAMPLE EMBODIMENT

Figure 1:
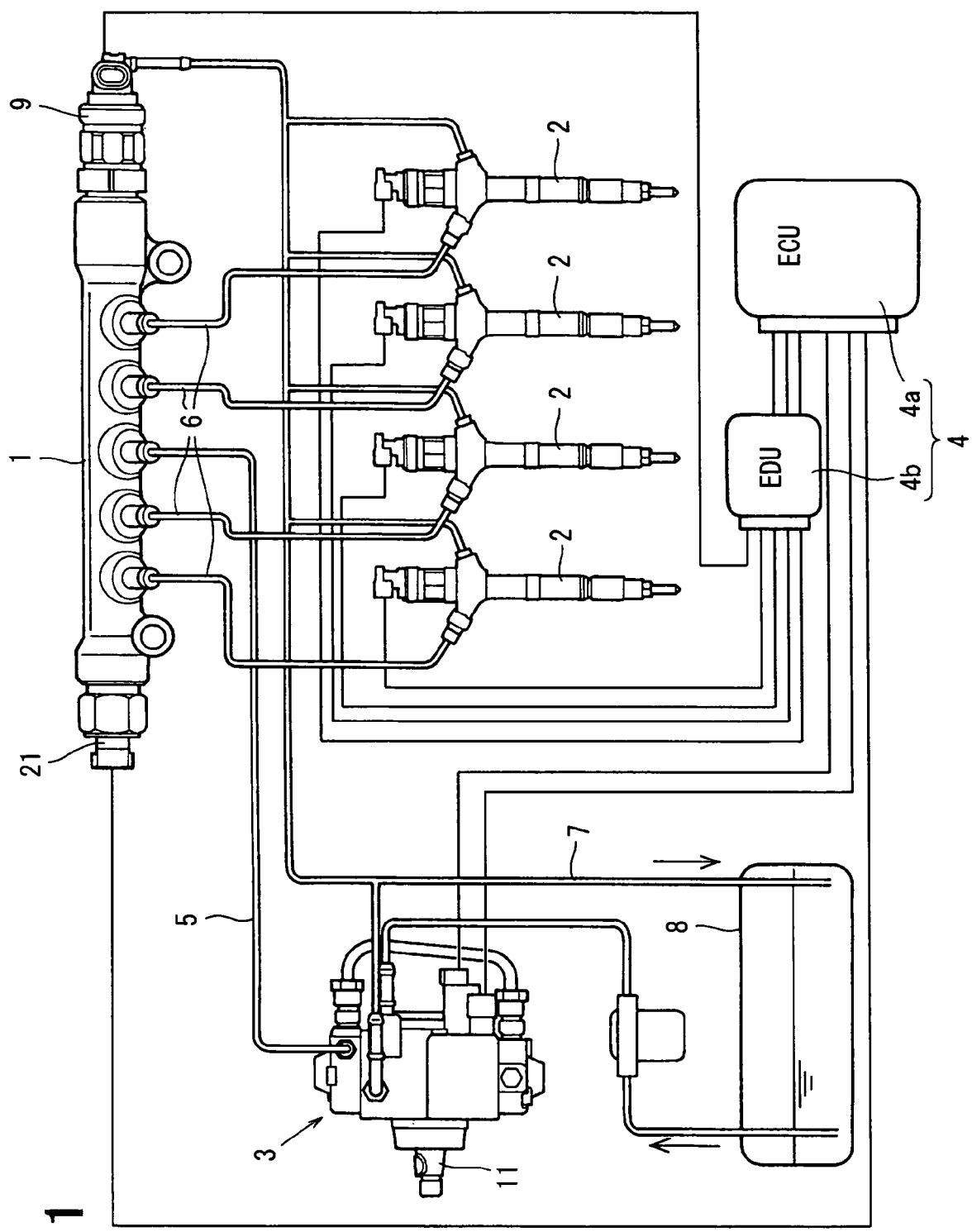
FIG. 1 is a schematic diagram showing a common rail fuel injection device according to an example embodiment of the present invention.

Referring to FIG. 1, a common rail fuel injection device according to an example embodiment of the present invention is illustrated. The common rail fuel injection device is a system for performing fuel injection into a diesel engine or the like. The common rail fuel injection device has a common rail 1, injectors 2, a supply pump 3, a controller 4 and the like. The controller 4 consists of an engine control unit 4a (ECU) and a drive unit 4b (EDU). The EDU 4b may be incorporated in a casing of the ECU 4a.

The engine has multiple cylinders, each of which performs suction stroke, compression stroke, explosion stroke and exhaustion stroke in series. As an example of the engine, a four-cylinder engine having four injectors 2 is shown. The present invention may be applied to an engine having the other number of cylinders.

The common rail 1 is a pressure accumulation vessel for accumulating high-pressure fuel, which is to be supplied to the injectors 2. In order to accumulate common rail pressure Pc as highly increased pressure corresponding to pressure for supplying the fuel to the injectors 2, the common rail 1 is connected with a discharge hole of the supply pump 3, which pressure-feeds the high-pressure fuel through a fuel pipe 5 (high-pressure fuel flow passage). The common rail 1 is connected with multiple injector pipes 6 for supplying the high-pressure fuel to the injectors 2.

Leak fuel from the injectors 2 is returned to a fuel tank 8 through a fuel return flow passage 7 (leak pipe). A pressure limiter 9 is attached to a fuel return passage 7 (relief pipe) leading from the common rail 1 to the fuel tank 8. The pressure limiter 9 has a function of a pressure safety valve that opens when the fuel pressure in the common rail 1 exceeds a limit set pressure to limit the fuel pressure in the common rail 1 to the limit set pressure or under. The pressure limiter 9 also has a function of a pressure reduction valve that quickly reduces the common rail pressure Pc in response to a command of the ECU 4a.

The injector 2 is mounted to each cylinder of the engine for injecting and supplying the fuel into the cylinder. The injector 2 is connected to a downstream end of each one of the injector pipes 6 branching from the common rail 1 and supplies the high-pressure fuel accumulated in the common rail 1 into each cylinder through the injection.

The supply pump 3 is a fuel pump for pressure-feeding the high-pressure fuel to the common rail 1. The supply pump 3 has a feed pump for suctioning the fuel from the fuel tank 8 into the supply pump 3 and a high-pressure pump for pressurizing the suctioned fuel to high pressure and for pressure-feeding the high-pressure fuel to the common rail 1. A common camshaft 11 drives the feed pump and the high-pressure pump. The camshaft 11 is driven and rotated by a crankshaft of the engine, for example. The supply pump 3 has a suction control valve (SCV) for metering a fuel amount suctioned by the high-pressure pump. The ECU 4a regulates the suction control valve to regulate the common rail pressure Pc.

The ECU 4a includes a microcomputer having functions of a CPU for performing control processing and calculation processing, a storage device (memory such as ROM, SRAM, EEPROM or RAM) for storing various types of programs and data, an input circuit, an output circuit, a power source circuit, an injector drive circuit and a pump drive circuit. The ECU 4a performs various calculation processing based on sensor signals (engine parameters: signals corresponding to manipulation states of vehicle occupant or operation states of engine) inputted to the ECU 4a.

The EDU 4b is a drive circuit for applying drive currents to the injectors 2 and the pressure limiter 9 in response to control signals provided by the ECU 4a.

The ECU 4a is connected with various sensors such as an accelerator sensor for sensing an accelerator position, a rotation speed sensor for sensing engine rotation speed and a coolant temperature sensor for sensing coolant temperature of the engine as well as a common rail pressure sensor 21 for sensing the common rail pressure Pc.

Figure 2:
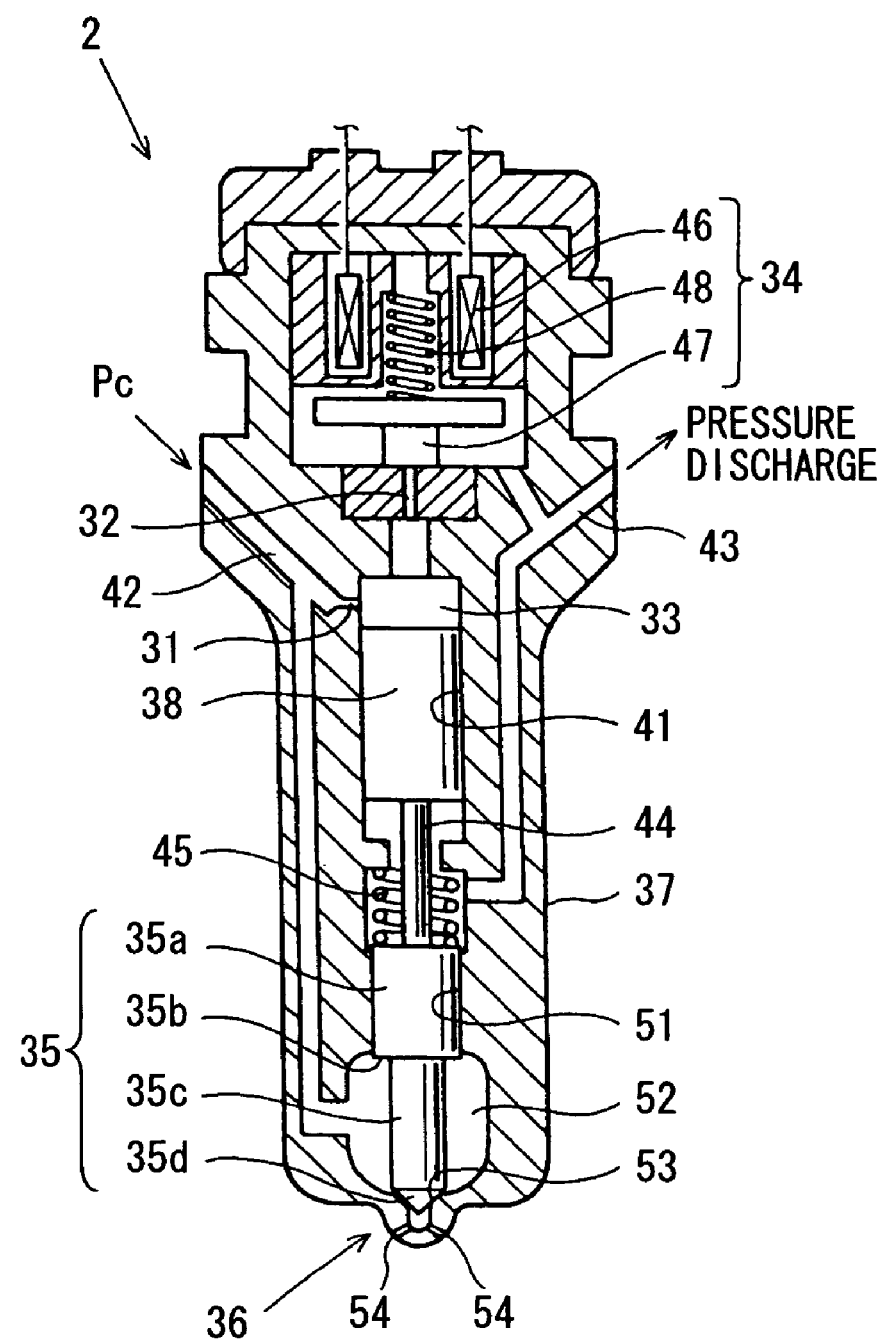
FIG. 2 is a cross-sectional view showing an injector according to the FIG. 1 embodiment.

Next, basic structure of the injector 2 according to the present embodiment will be explained in reference to FIGS. 2 and 3. The injector 2 injects the high-pressure fuel, which is supplied from the common rail 1, into the cylinder of the engine. The injector 2 according to the present embodiment is a two-way valve injector having a control chamber 33 and a nozzle 36. The common rail pressure Pc is applied to the control chamber 33 through an inflow passage 31 (fuel passage provided with an in-orifice). The pressure in the control chamber 33 is discharged through a discharge passage 32 (fuel passage provided with out-orifice). An electromagnetic valve 34 (example of electric-operated valve) opens and closes the discharge passage 32. Thus, if the control chamber pressure Pcc (pressure inside control chamber 33) decreases to valve opening pressure Popn, a needle 35 lifts and the nozzle 36 injects the fuel.

A housing 37 of the injector 2 (for example, nozzle holder) is formed with a cylinder 41, a high-pressure fuel passage 42, a pressure discharge fuel passage 43 and the like. The cylinder 41 holds a command piston 38 such that the command piston 38 can slide in a vertical direction (valve opening-closing direction of the needle 35). The high-pressure fuel passage 42 leads the high-pressure fuel supplied from the common rail 1 toward the nozzle 36 and the inflow passage 31. The pressure discharge fuel passage 43 discharges the high-pressure fuel to a low-pressure side. The command piston 38 is inserted in the cylinder 41 and is linked with the needle 35 through a pressure pin 44.

The pressure pin 44 is interposed between the command piston 38 and the needle 35. A spring 45 is provided around the pressure pin 44 for biasing the needle 35 downward (in valve closing direction). The control chamber 33 is formed above the cylinder 41 (on electromagnetic valve 34 side of cylinder 41). The volume Vcc of the control chamber 33 changes in accordance with vertical movement of the command piston 38.

The inflow passage 31 is an inlet side fuel restrictor for depressurizing the high-pressure fuel supplied from the high-pressure fuel passage 42. The high-pressure fuel passage 42 communicates with the control chamber 33 through the inflow passage 31. The discharge passage 32 is an outlet side fuel restrictor formed above the control chamber 33 for restricting the fuel discharged from the control chamber 33 to the pressure discharge fuel passage 43 (low-pressure side). The control chamber 33 communicates with the pressure discharge fuel passage 43 through the discharge passage 32.

The electromagnetic valve 34 has a solenoid 46, which generates electromagnetic force when energized (ON), a valve 47 magnetically attracted upward (in valve opening direction) by the electromagnetic force generated by the solenoid 46, and a return spring 48 for biasing the valve 47 downward (in valve closing direction). For example, the valve 47 has a ball valve 47a (shown in FIG. 3) for opening and closing the discharge passage 32. When the solenoid 46 is OFF, the valve 47 is biased downward by the biasing force of the return spring 48 and the ball valve 47a blocks the discharge passage 32. If the solenoid 46 is ON, the valve 47 moves upward against the biasing force of the return spring 48. Accordingly, the ball valve 47a lifts upward from a seat face to open the discharge passage 32.

The housing 37 of the injector 2 is formed with a sliding hole 51, a nozzle chamber 52, a conical valve seat 53 and multiple injection holes 54. The sliding hole 51 holds the needle 35 such that the needle 35 can slide in the vertical direction (opening/closing direction). The nozzle chamber 52 communicates with the high-pressure fuel passage 42 and is formed in an annular shape around the needle 35. The needle 35 is seated on the valve seat 53 in a valve closing period. The high-pressure fuel is injected through the injection holes 54. The injection holes 54 are formed by boring process within a seat diameter Dns of a seat 55, at which the needle 35 is seated on the valve seat 53.

The needle 35 has a sliding shaft 35a held by the sliding hole 51, a pressure receiving face 35b formed below the sliding shaft 35a, a shaft 35c that has a small shaft diameter and extends downward from the pressure receiving face 35b, and a cone valve 35d that opens or closes the injection holes 54 by separating from or being seated on the valve seat 53. The sliding shaft 35a is provided such that the sliding shaft 35a can reciprocate in an axial direction while achieving sealing between the nozzle chamber 52 and the low-pressure side (space around pressure pin 44).

The cone valve 35d at the tip end of the needle 35 consists of an upper truncated cone section and a lower cone tip end section. The seat 55 is formed at a boundary between the upper truncated cone section and the lower cone tip end section. A spread angle of the upper truncated cone section is smaller than that of the valve seat 53. A spread angle of the lower cone tip end section is larger than that of the valve seat 53. When the cone valve 35d is seated on the valve seat 53, the seat 55 of the cone valve 35d contacts the valve seat 53 to block the communication between the nozzle chamber 52 and the injection holes 54.

Figure 3:
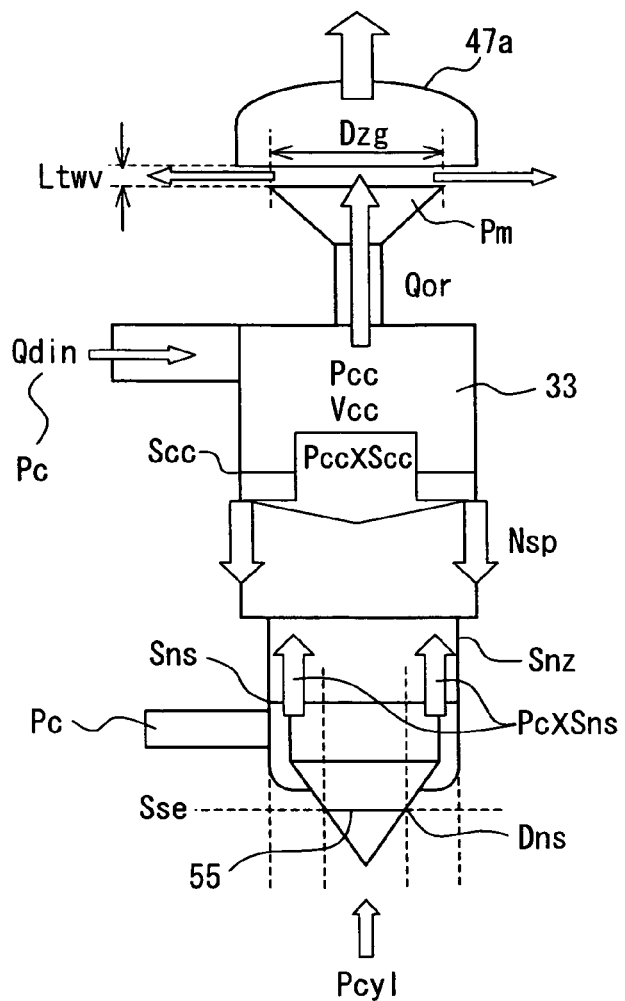
FIG. 3 is a schematic diagram showing a model of the injector according to the FIG. 1 embodiment.

In FIG. 3, Ltwv represents a valve lift amount of the valve 47, Dzg is a counterbore diameter of the discharge passage 32, Pm is pressure, Qor is an outflow amount of the fuel, Qdin is an inflow amount of the fuel, Scc is a sectional area of the command piston 33, Nsp is a set load, Sns is a pressure receiving sectional area of the nozzle 36, Snz is a sectional area of the sliding shaft 35a, Sse is a sectional area of the seat 55, and Pcyl is pressure inside the cylinder.

Next, basic operation of the injector 2 will be explained in reference to FIGS. 4A to 4E and 5.

(A) The electromagnetic valve 34 is de-energized while the injector 2 is stopped. Thus, the valve 47 closes the discharge passage 32 and the pressure Pcc in the control chamber 33 is maintained at high pressure. The pressure Pcc is balanced out with a large downward force Fdown as shown in FIG. 4A. Thus, the needle 35 is pressed against the valve seat 53, so the communication between the nozzle chamber 52 and the injection holes 54 is broken. Thus, the fuel injection through the injection holes 54 is not performed.

(B) If the drive current I is applied from the EDU 4b to the electromagnetic valve 34 because of the injection start command from the ECU 4a (injection command: ON), the solenoid 46 magnetically attracts the valve 47 (TWV) as shown in FIG. 4B. If the valve 47 starts lifting up, the discharge passage 32 is opened and the pressure Pcc in the control chamber 33, which is depressurized in the inflow passage 31, starts reducing. Accordingly, the downward force Fdown reduces.

Figure 5:
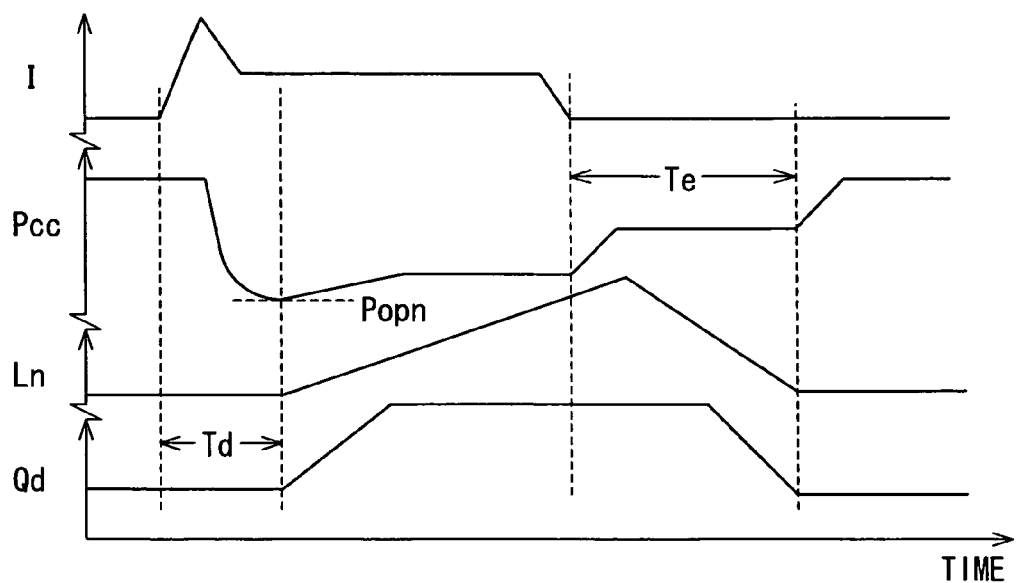
FIG. 5 is a time chart showing relationships among injector drive current, control chamber pressure, a needle lift amount and an injection rate according to the FIG. 1 embodiment.

(C) If the pressure Pcc in the control chamber 33 reduces to the valve opening pressure Popn, the needle 35 starts lifting up as shown in FIG. 4C. If the needle 35 separates from the valve seat 53, the nozzle chamber 52 communicates with the injection holes 54. Thus, the high-pressure fuel supplied to the nozzle chamber 52 is injected through the injection holes 54. A period from the time when the injection start command is outputted to the time when the injection is actually started shown in FIG. 5 is referred to as an injection start delay Td hereinafter. As the needle 35 lifts (i.e., as a nozzle lift Ln increases), the injection rate Qd increases as shown in FIG. 5.

If the injection rate Qd reaches the maximum injection rate during the injection, the injection rate Qd does not increase further, so an injection waveform becomes a trapezoidal shape as shown in FIG. 5. The injector 2 is a flying needle type injector, in which the needle 35 keeps lifting even after the maximum injection rate is reached.

(D) If the drive current I applied to the electromagnetic valve 34 by the EDU 4b is stopped because of an injection stop command from the ECU 4a (injection command: OFF), the solenoid 46 stops magnetically attracting the valve 47, so the valve 47 starts descending as shown in FIG. 4D. If the valve 47 (TWV) of the electromagnetic valve 34 closes the discharge passage 32, the pressure Pcc in the control chamber 33 starts increasing. Accordingly, the downward force Fdown increases. If the pressure Pcc in the control chamber 33 increases to valve closing pressure, the needle 35 starts descending.

(E) If the needle 35 descends and is seated on the valve seat 53, the communication between the nozzle chamber 52 and the injection holes 54 is broken as shown in FIG. 4E. Thus, the fuel injection from the injection holes 54 is stopped and the state shown in FIG. 4A is resumed. A period from the time when the drive signal I is stopped to the time when the injection actually stops shown in FIG. 5 is referred to as an injection end delay Te hereinafter.

Next, fuel injection control performed by the ECU 4a according to the present embodiment will be explained. In the present embodiment, the multiple fuel injections (multi-injection) are performed during one cycle in accordance with the operation state of the engine to simultaneously achieve inhibition of engine vibration and engine noise, purification of exhaust gas and improvement of engine output and fuel consumption at high levels.

The ECU 4a calculates target injection timing and target injection amount corresponding to the present operation state based on the programs (maps) stored in the ROM and the engine parameters inputted into the RAM for each fuel injection. At the meantime, the ECU 4a calculates timing for generating the command signal I of the injector 2, i.e., ON/OFF timing of the injector drive current I, to make the injector 2 start the fuel injection at the target injection timing and inject the target injection amount.

The injector individual data are attached to each injector 2 mounted in the fuel injection device in the form of the QR code or the like. The injector individual data are injector variation data based on the injection rate of the injector 2 measured outside the cylinder of the engine when the injector 2 is shipped. The ECU 4a reads the injector individual data of each injector 2 from the code table attached to the injector 2 and stores the injector individual data into the storage device when the injector 2 is mounted in the vehicle.

The ECU 4a has a correcting device for performing variation correction of the injector 2 based on the stored injector individual data. The correcting device corrects a control parameter for fuel injection corresponding to an engine operation state based on the injector individual data to bring the injection characteristics of the injector to designed median values.

In recent years, in order to simultaneously achieve reduction of engine vibration and an engine noise, purification of exhaust gas and improvement of engine output and fuel consumption at high levels, highly accurate injection control of the injector 2 has been required. Specifically, extremely accurate injection control is required in the multi-injection. Therefore, the ECU 4a corrects the injection variation of each injector 2 to obtain the accurate injection characteristics of each injector 2 substantially conforming to the designed median values.

However, in some cases, the accurate injection characteristics substantially conforming to the designed median values cannot be obtained in a state in which the injector 2 is actually mounted in the engine.

The inventor discovered that tendency of the variation differs between an outside and an inside of the cylinder. The inventor discovered that the correction becomes excessive due to in-cylinder pressure Pcyl during the operation of the engine if a variation correction value is calculated directly from the injector individual data obtained outside the cylinder and that there is a possibility that the injection characteristics deviate from the designed median values.

Conventional technology performs the injection correction based on the injector individual data obtained outside the cylinder and performs the correction to substantially conform the injection characteristics to the designed median values outside the cylinder.

Figure 6A:
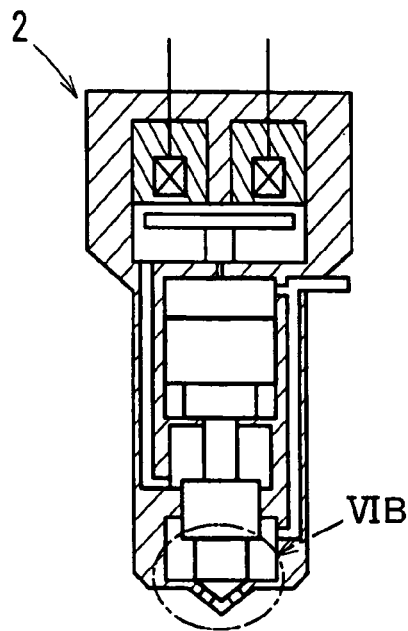
FIGS. 6A to 6C are diagrams showing a substantial portion of the injector according to the FIG. 1 embodiment.
Figure 6B:
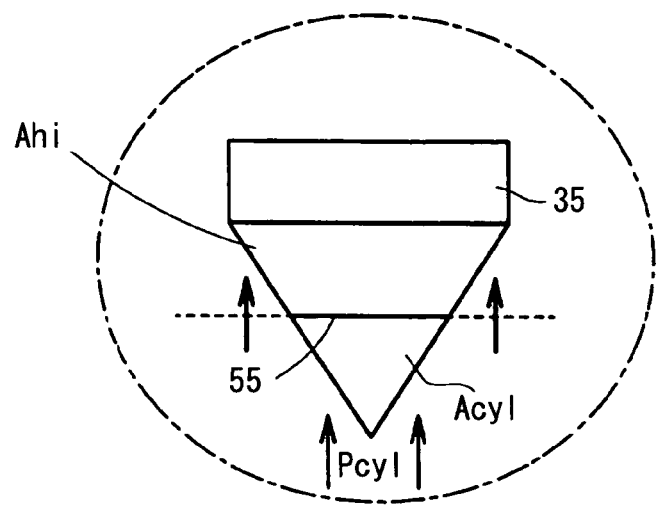

When the injector 2 starts the injection inside the cylinder, as shown in FIGS. 6A and 6B, the in-cylinder pressure Pcyl acts on the inner periphery of the seat 55 in an in-cylinder pressure receiving area Acyl. Thus, the upward force is applied to the needle 35, so the injection characteristics are differentiated between the outside and the inside of the cylinder. Ahi in FIG. 6B represents a high-pressure section pressure receiving area.

Figure 7:
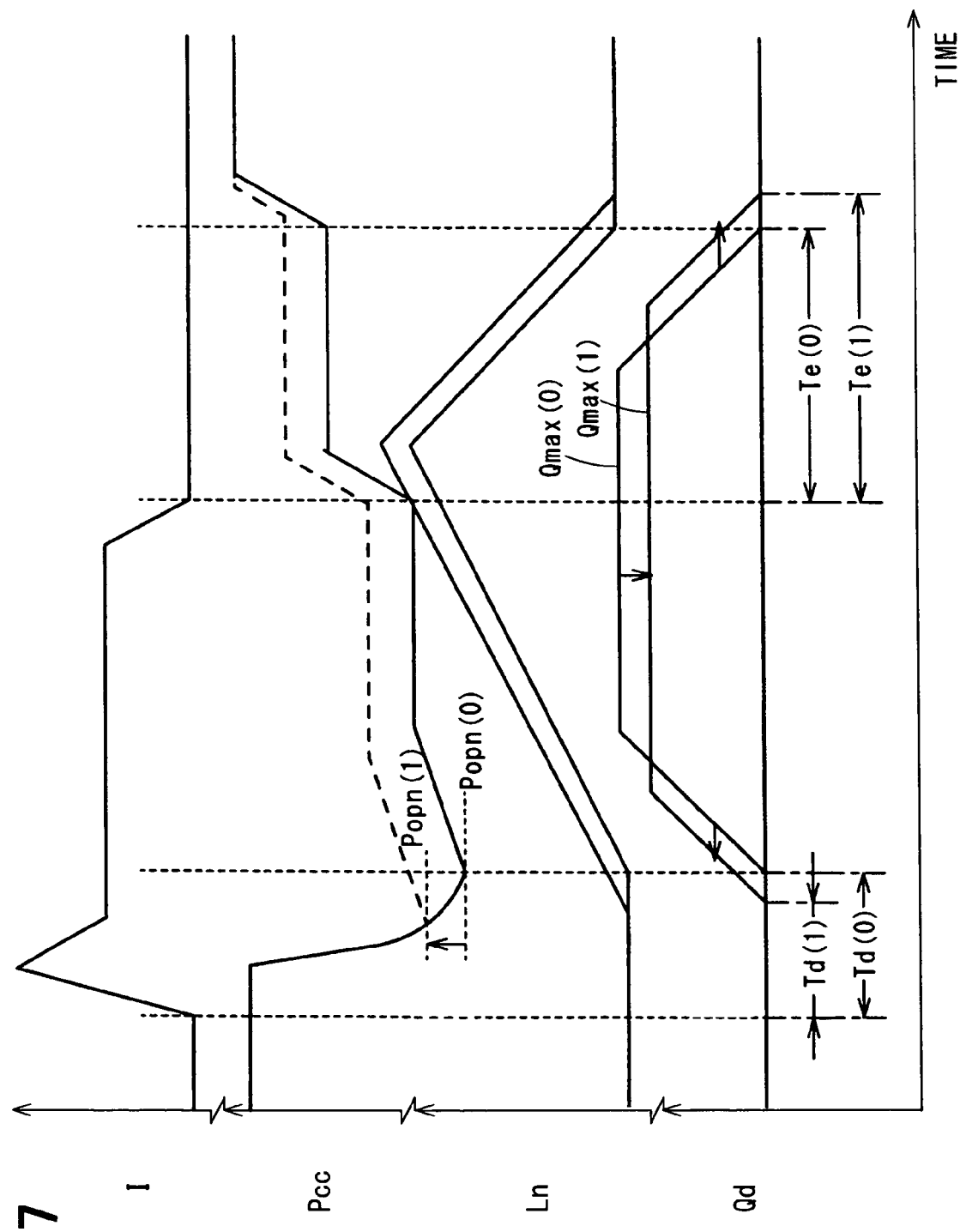
FIG. 7 is a time chart showing changes inside a cylinder from states outside the cylinder according to the FIG. 1 embodiment.

Thus, as shown in FIG. 7, the valve opening pressure Popn increases from an outside-cylinder value Popn(0) to an inside-cylinder value Popn(1). As a result, the lift start timing of the needle 35 is advanced, so the injection start delay Td is shortened from an outside-cylinder value Td(0) to an inside-cylinder value Td(1). Since the seating timing of the needle 35 is delayed, the injection end delay Te is lengthened from an outside-cylinder value Te(0) to an inside-cylinder value Te(1). Because of an influence of the in-cylinder pressure Pcyl, the injection start timing is advanced and the injection end timing is delayed.

Figure 6C:
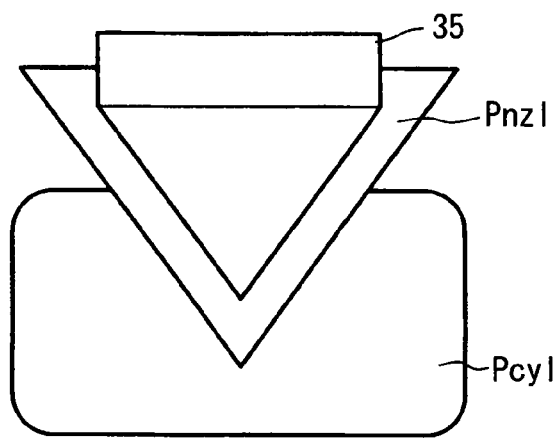

Likewise, in the case where the injector 2 performs the injection inside the cylinder, differential pressure between the fuel pressure Pnzl supplied to the nozzle 36 and the in-cylinder pressure Pcyl becomes small compared to the differential pressure between the fuel pressure Pnzl and the outside-cylinder pressure as shown in FIG. 6C. Accordingly, as shown in FIG. 7, the maximum injection rate Qmax reduces from an outside-cylinder value Qmax(0) to an inside-cylinder value Qmax(1).

Next, an example in which the variation correction value becomes unsuitable (excessive) between the inside and the outside of the cylinder will be explained in reference to FIG. 8. For example, it is assumed that three injector individuals A, B, C respectively have variations A, B, C in the injection start delay Td. The respective injector individuals A, B, C are set such that the range of the variation falls within a certain non-adjustment variation range a even if the adjustment is not performed.

Figure 8:
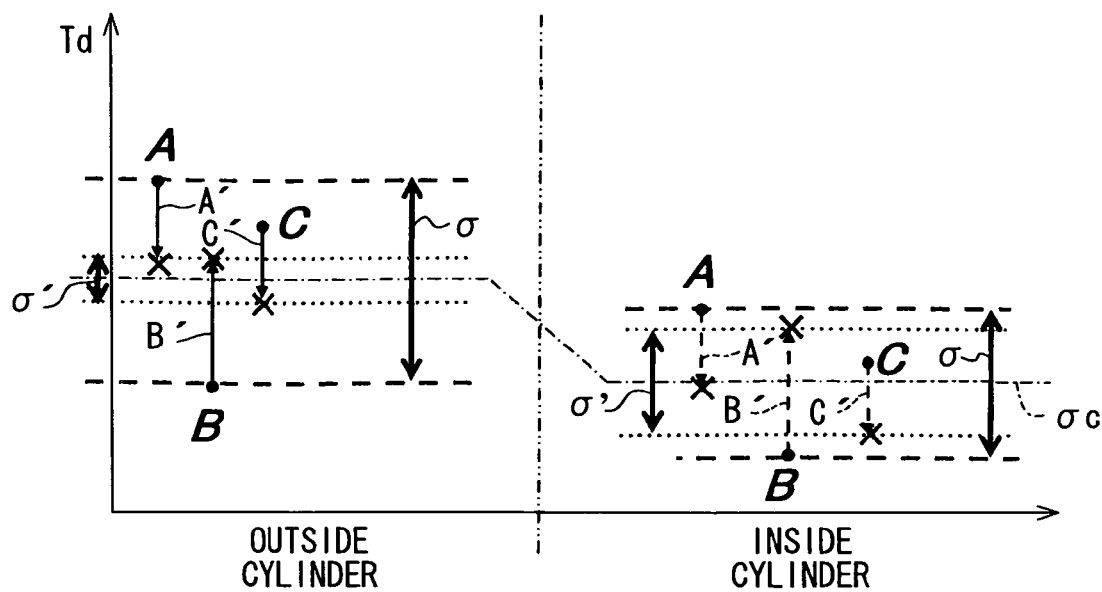
FIG. 8 is a diagram showing excessive correction inside the cylinder.

The correcting device of the conventional technology corrects the injection start delay Td into a predetermined adjustment variation range σ' substantially conforming to a designed median value outside the cylinder as shown on the left side of a double-dashed line in FIG. 8. A chained line σc in FIG. 8 represents the center of the variation. Correction amounts A', B', C' for the respective injector individuals A, B, C are obtained.

The variation tends to decrease inside the cylinder due to the influence of the in-cylinder pressure Pcyl. Therefore, as shown on the right side of the double-dashed line in FIG. 8, if the correction amounts A', B', C' are added also inside the cylinder, the variations B, C of the individuals B, C are corrected excessively, deteriorating the injection accuracy. In some cases, there is a possibility that the adjustment variation range σ' becomes wider than the non-adjustment variation range a due to excessive correction.

Therefore, the ECU 4a according to the present embodiment has an in-cylinder pressure correcting device simultaneously achieving a first correcting function of correcting the injection rate Qd, the injection start timing and the injection end timing, which are changed by the influence of the in-cylinder pressure Pcyl regardless of the individual variation of the injector 2, and a second correcting function of correcting the injection rate Qd, the injection start timing and the injection end timing, which are changed by the influence of the in-cylinder pressure Pcyl because of the individual variation of the injector 2. The in-cylinder pressure correcting device is part of the above-described correcting device (program) for correcting the variation in the injection characteristics, which differ between the inside and the outside of the cylinder, to suitable values by incorporating the in-cylinder pressure Pcyl into the injector individual data.

The ECU 4a has an in-cylinder pressure setting device for sensing or estimating the in-cylinder pressure Pcyl or for setting the in-cylinder pressure Pcyl at a predetermined value for at least the in-cylinder pressure correcting device.

Next, the in-cylinder pressure correcting device will be explained. First, factors that cause a change in the injection characteristics are estimated based on the relationship between the individual variation of the injector 2 and the in-cylinder pressure Pcyl.

Figure 9:
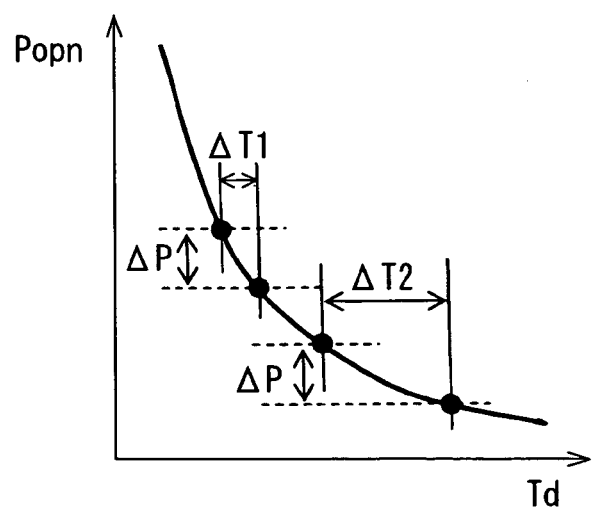
FIG. 9 is a graph showing a relationship between sensitivity of injection start delay and valve opening pressure.

Estimated Factor #1: A factor of degradation of sensitivity of the injection start delay Td due to the increase of the valve opening pressure Popn is estimated. As described above, the needle 35 receives the assist of the in-cylinder pressure Pcyl inside the cylinder. Accordingly, the absolute value of the valve opening pressure Popn increases, so the variation sensitivity of the injection start delay Td is decreased. As shown in FIG. 9, when the increase breadth ΔP of the valve opening pressure Popn is the same, the change difference ΔT1 of the injection start delay Td corresponding to the higher valve opening pressure Popn is smaller than the change difference ΔT2 of the injection start delay corresponding to the lower valve opening pressure Popn.

Figure 10A:
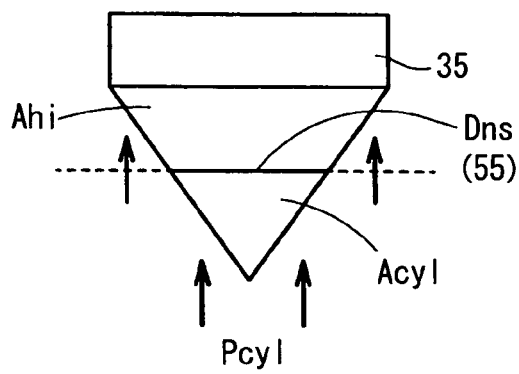
FIGS. 10A and 10B are diagrams showing a relationship between a seat diameter and a pressure receiving area of in-cylinder pressure.
Figure 10B:
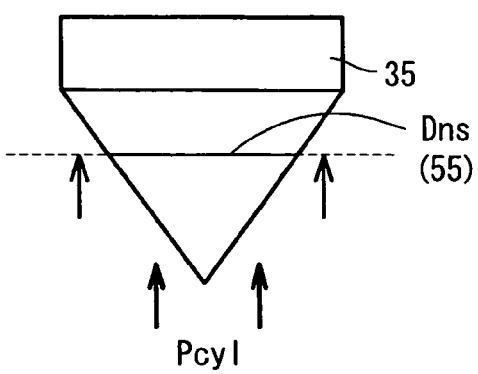

Estimated Factor #2: The change of the injection start delay Td due to the influence of the variation in the seat diameter Dns is estimated. Outside the cylinder, the valve opening pressure Popn simply decreases as the seat diameter Dns increases. The injection start delay Td increases and the injection amount Q decreases correspondingly. Inside the cylinder, as shown in FIG. 10A, the assist by the in-cylinder pressure Pcyl decreases as the seat diameter Dns decreases. The assist amount of the needle 35 by the in-cylinder pressure Pcyl increases as the seat diameter Dns increases as shown in FIG. 10B. Relationships shown in following Table (1) are provided.

TABLE (1)

|  | Outside the Cylinder | | Inside the Cylinder | |
| --- | --- | --- | --- | --- |
| Dns | Ahi | In-cylinder Pressure Assist | Ahi | In-cylinder Pressure Assist |
| Small | Large | 0 | Large | Small |
| Large | Small | 0 | Small | Large |

Figure 11A:
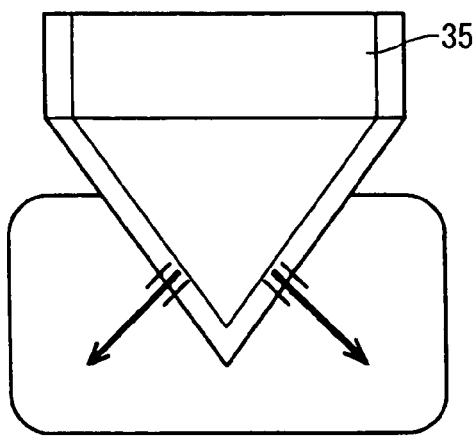
FIGS. 11A and 11B are diagrams showing decrease of variation in an injection flow rate due to the in-cylinder pressure.
Figure 11B:
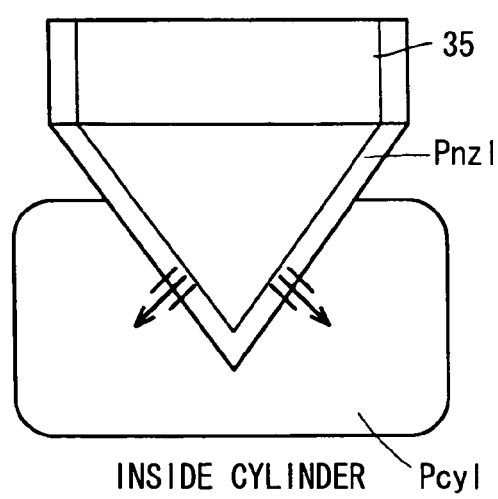

Estimated Factor #3: A change in an injection rate Q' due to a variation ΔQ'0 in an injection flow amount Q'0 is estimated. Outside the cylinder, pressure in the injection space is atmospheric pressure as shown in FIG. 11A. Accordingly, the differential pressure between the fuel pressure Pnzl supplied to the nozzle 36 and the atmospheric pressure is large. Inside the cylinder, as shown in FIG. 11 B, the pressure in the injection space is the in-cylinder pressure Pcyl. Therefore, the differential pressure between the fuel pressure Pnzl supplied to the nozzle 36 and the in-cylinder pressure Pcyl is small compared to the case of the outside of the cylinder.

The sensitivity of a variation ΔQ' in the injection rate Q' with respect to the injection flow amount variation ΔQ'0 is larger outside the cylinder than inside the cylinder as shown by following equations.

$$Q' = Q'0 \times \sqrt{Pnzl - Pcyl}$$

$$Q' + \Delta Q' = (Q'0 + \Delta Q'0) \times \sqrt{Pnzl - Pcyl}$$

$$\Delta Q' = \Delta Q'0 \times \sqrt{Pnzl - Pcyl}$$

Figure 12:
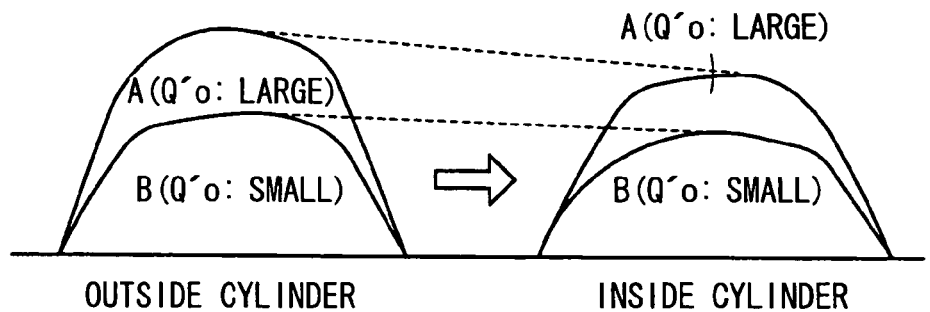
FIG. 12 is a diagram showing decrease of variation in the injection rate due to the in-cylinder pressure.

The variation in the injection flow amounts Q'0 of the injector individuals A, B is smaller inside the cylinder than outside the cylinder as shown in FIG. 12. That is, inside the cylinder, both of the injection rates Q' of the injector individuals A, B decrease and the difference between the injection rates Q' also decreases. The sensitivity of the individual difference reduces also in the case where the injection flow amount Q'0 differs between the inside and the outside of the cylinder due to fuel temperature and the like.

Figure 13A:
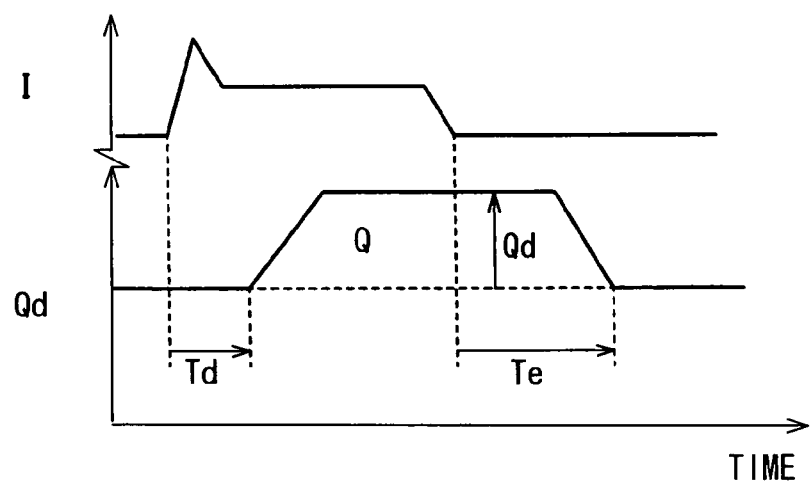
FIGS. 13A and 13B are diagrams showing measurement of the injection rate of the injector outside the cylinder according to the FIG. 1 embodiment.
Figure 13B:
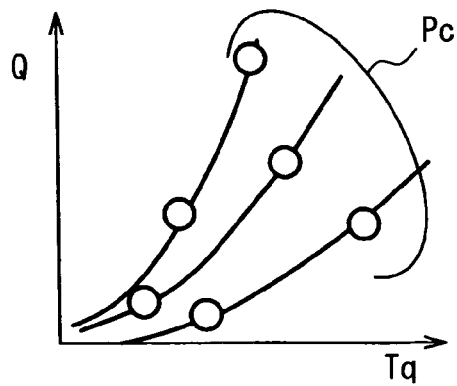

As described above, the injector individual data in the form of the code table such as the QR code are attached to each injector 2. The injector individual data are injector variation data based on the injection rate of the injector 2 measured outside the cylinder of the engine when the injector 2 is shipped. When the injector 2 is shipped, the injection amount Q, the injection start delay Td, the injection end delay Te and the injection rate Qd of each injector 2 are measured at multiple points of the common rail pressure Pc and the injector energization period Tq outside the cylinder as shown in FIGS. 13A and 13B. Thus, the differences (variation degree) between the measurement data and the designed median values are obtained. The thus-obtained variation data are attached to the injector 2 as the code table such as the QR code.

The ECU 4a reads the injector individual data of each injector 2 from the code table attached to the injector 2 and stores the injector individual data into the storage device when the injector 2 is mounted in the vehicle.

For example, the variations in the seat diameter Dns, the orifice flow amount Qor (flow amount of fuel discharged from control chamber 33 through discharge passage 32), the valve lift Ltwv (lift amount from seated state to maximum lift of valve 47) and the like are estimated as shown by a following expression (1) based on the variations in the injection amount Q, the injection start delay Td, the injection end delay Te, the injection rate Qd and the like, which are read from the code table, and are stored in the storage device. Matrix A in Expression (1) represents designed values obtained by sensitivity analysis and the like.

Expression (1):

$$\begin{bmatrix} Q \\ Td \\ Te \end{bmatrix} = \begin{bmatrix} a11 & a12 & a13 \\ a21 & a22 & a23 \\ a31 & a32 & a33 \end{bmatrix} \begin{bmatrix} Dns \\ Qor \\ Ltwv \end{bmatrix},$$

$$\begin{bmatrix} Dns \\ Qor \\ Ltwv \end{bmatrix} = A^{-1} \begin{bmatrix} Q \\ Td \\ Te \end{bmatrix}$$

where $$A = \begin{bmatrix} a11 & a12 & a13 \\ a21 & a22 & a23 \\ a31 & a32 & a33 \end{bmatrix}$$

The in-cylinder pressure correcting device of the ECU 4a performs calculation of the following variation correction for each injection of the injector 2.

First Step: The in-cylinder valve opening pressure Popn(1) is calculated from the seat diameter Dns. The in-cylinder valve opening pressure Popn(1) is calculated by following expression (2). Ppul in Expression (2) represents pressure pulsation.

Expression (2):

$$Popn = \frac{(Pc + Ppul) \times Sns + Pcyl \times (Snz - Sns) - Nsp}{Scc}$$

Figure 14:
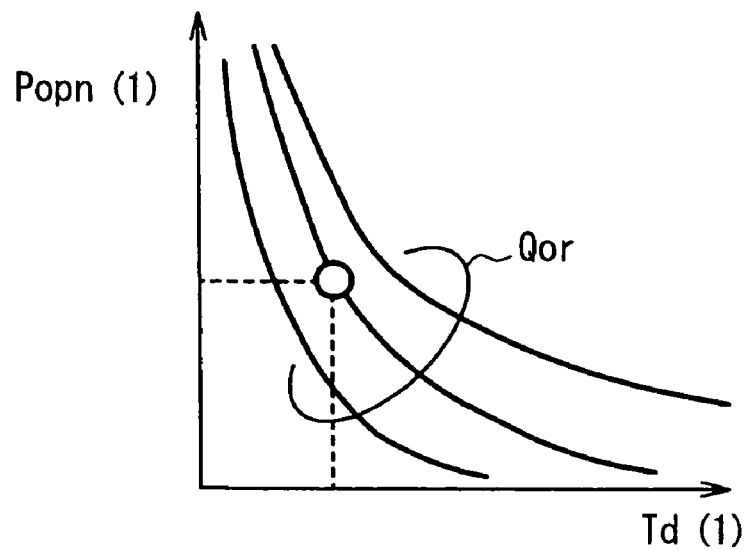
FIG. 14 is a map for obtaining the injection start delay from the in-cylinder pressure and an orifice flow amount according to the FIG. 1 embodiment.

Second Step: The in-cylinder injection start delay Td(1) is calculated from the relationship between the in-cylinder valve opening pressure Popn(1) calculated above and the orifice flow amount Qor. For example, the in-cylinder injection start delay Td(1) is calculated from the relationship between the in-cylinder valve opening pressure Popn(1) and the orifice flow amount Qor based on a map shown in FIG. 14.

Figure 15:
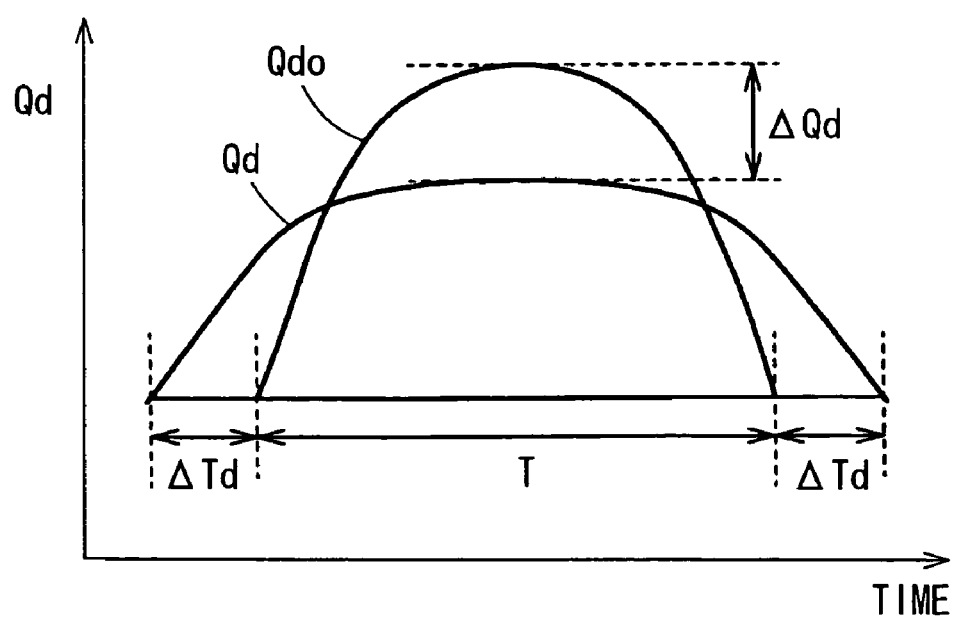
FIG. 15 is a diagram showing a change in the injection rate between the inside and the outside of the cylinder.

Third Step: Double the difference between the in-cylinder injection start delay Td(1) calculated at the Second Step and the outside-cylinder injection start delay Td(0) is added to the injector injection period T. That is, a cylinder inside-outside difference ΔTd in the injector injection period T between the inside and the outside of the cylinder is calculated as the double the difference between the in-cylinder injection start delay Td(1) and the outside-cylinder injection start delay Td(0) as shown in FIG. 15 ((Td(1)−Td(0))×2).

Fourth Step: A cylinder inside-outside difference ΔQd in the injection rate between the inside and the outside of the cylinder is calculated from following Expression (3). In Expression (3), Qd represents the in-cylinder injection rate and Qd0 is the outside-cylinder injection rate.

Expression (3):

$$Qd = Qd0 \times \sqrt{\frac{Pnzl - Pcyl}{Pnzl}}$$

A correction value Qc of the injection amount is calculated by using the cylinder inside-outside difference ΔTd of the injector energization period and the cylinder inside-outside difference ΔQd of the injection rate. More specifically, the correction value of the injection amount is calculated based on following Expression (4). In Expression (4), Q represents the in-cylinder injection amount and Q0 is the outside-cylinder injection amount.

Expression (4):

$$Q = Q0 \times \frac{T + 2\Delta Td}{T} \times \sqrt{\frac{Pnzl - Pcyl}{Pnzl}}$$

Figure 16:
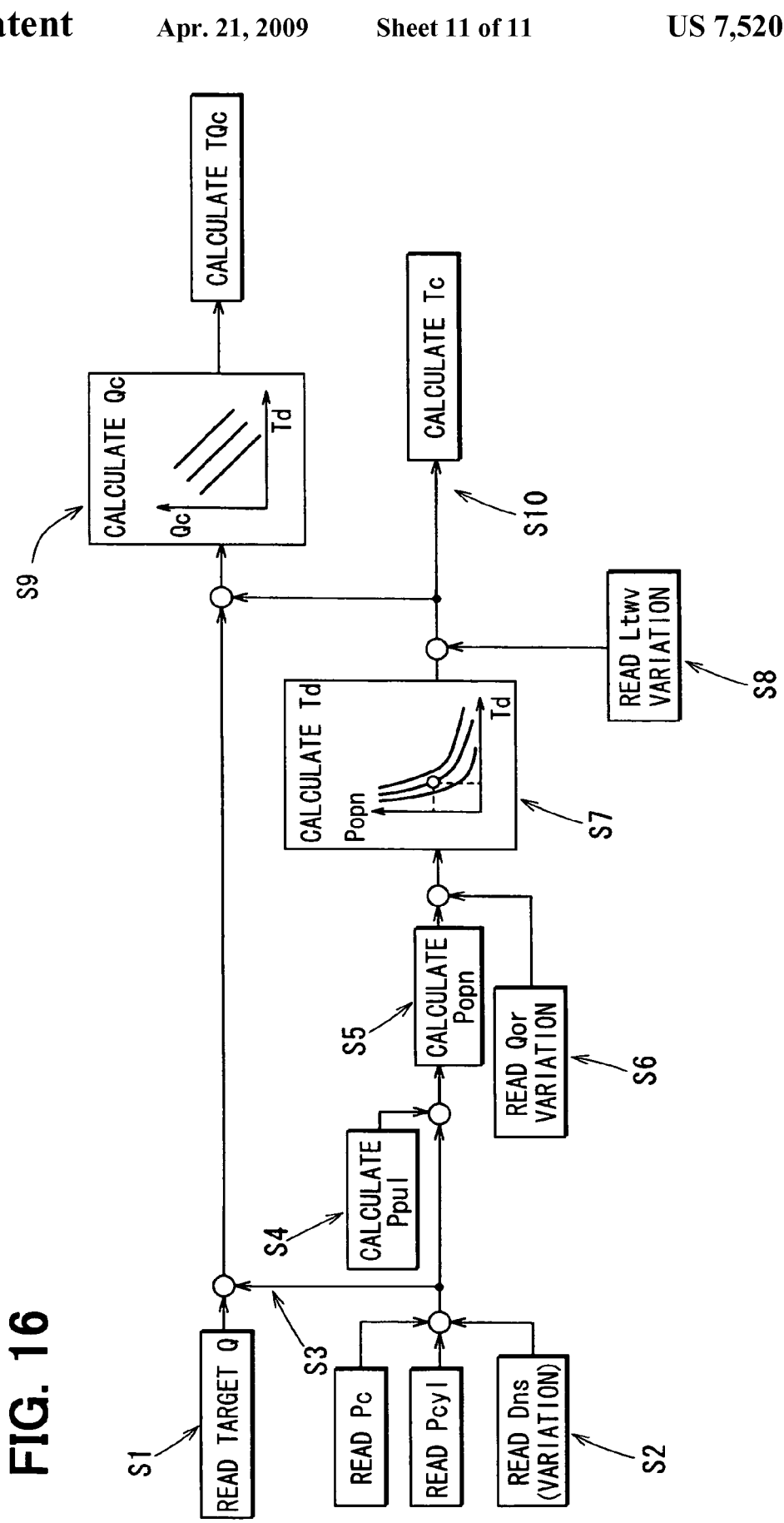
FIG. 16 is a block diagram showing a correction flow of in-cylinder injection variation according to the FIG. 1 embodiment.

Next, a flow of the correction of the in-cylinder injection variation performed by the ECU 4a will be explained in reference to FIG. 16.

Step S1 reads a target value of the injection amount Q calculated for each fuel injection.

Step S2 reads the common rail pressure Pc, the in-cylinder pressure Pcyl and the seat diameter Dns (variation). The in-cylinder pressure Pcyl may be an estimated value or a value actually sensed by an in-cylinder pressure sensor.

Step S3 calculates the correction value Qc of the injection amount Q by the Fourth Step described above.

Step S4 calculates the pressure pulsation Ppul.

Step S5 calculates the in-cylinder valve opening pressure Popn(1) by the First Step described above.

Step S6 reads the variation in the orifice flow amount Qor.

Step S7 calculates the in-cylinder injection start delay Td(1) by the Second Step described above.

Step S8 reads the variation in the valve lift Ltwv.

Step S9 calculates the correction value TQc of the injector energization period (valve opening period) based on the Third and Fourth Steps described above.

Step S10 calculates the correction value Tc of the generation timing of the command signal of the injector 2 (ON/OFF timing of injector drive current I) based on the in-cylinder injection start delay Td(1) calculated by the Second Step described above.

The common rail fuel injection device according to the present embodiment obtains the in-cylinder variation correction value by incorporating the in-cylinder pressure Pcyl into the injector individual data obtained through the measurement performed outside the cylinder as described above. Thus, the fuel injection device corrects the target injection amount and the generation timing of the command signal of the injector 2 (ON/OFF timing of injector drive current I). Accordingly, the accurate injection characteristics substantially conforming to the designed median values can be obtained inside the cylinder. Thus, even if the variation data of the injector 2 are measured outside the cylinder, the accurate injection characteristics substantially conforming to the designed median values can be obtained inside the cylinder. As a result, significantly accurate injection control can be performed.

Since the variation of the injector 2 is corrected by incorporating the in-cylinder pressure Pcyl into the injector individual data obtained through measurement performed outside the cylinder, extremely accurate injection control can be performed. Accordingly, by applying this scheme to the multi-injection, extremely accurate multi-injection control can be performed. As a result, inhibition of the engine vibration and engine noise, purification of the exhaust gas and improvement of the engine output and the fuel consumption can be achieved at the same time at a high level.

Moreover, the in-cylinder valve opening pressure Popn(1) is obtained in consideration of the pulsation caused in the common rail pressure Pc applied to the injector 2, and the variation correction considering the in-cylinder pressure Pcyl is performed based on the in-cylinder valve opening pressure Popn(1). Accordingly, the influence of the pulsation accompanying the multi-injection can be corrected. As a result, extremely accurate multi-injection control can be realized inside the cylinder to substantially conform the injection characteristics to the designed median values.

In the above-described embodiment, the multi-injection is performed. Alternatively, the present invention may be applied to a single injection of performing a single injection during a cycle.

In the case where the present invention is applied to the multi-injection, the multi-injection may be equal amount multi-injection of substantially equally dividing an injection amount to be injected during a cycle and of performing injection of the divided injection amount multiple times during the cycle. Alternatively, the present invention may be applied to multi-injection of dividing an injection during a cycle into a minute amount injection and a main injection and of performing at least one minute amount injection before the main injection. The present invention may be applied to multi-injection of performing at least one minute amount injection before the main injection and at least one minute amount injection after the main injection.

In the above-described embodiment, the electromagnetic valve 34 drives the valve 47 with the attraction of the solenoid 46 as an example of the electric-operated valve. Alternatively, an electric-operated valve using other electric actuator, which drives the valve 47 when energized, may be used. For example, the valve 47 may be driven by operation of a piezo actuator.

In the above-described embodiment, the present invention is applied to the common rail fuel injection device. The present invention may be applied to a fuel injection device that does not use the common rail. The present invention may be applied to a fuel injection device used in a gasoline engine or the like instead of the diesel engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection device of an engine, the fuel injection device comprising:
   an injector for injecting fuel;
   a correcting device that performs variation correction of the injector by using injector individual data based on an injection rate of the injector measured outside a cylinder of the engine; and
   a setting device that senses or estimates in-cylinder pressure inside the cylinder of the engine or that sets the in-cylinder pressure at a predetermined value, wherein
   the correcting device performs the variation correction of the injector by incorporating the in-cylinder pressure into the injector individual data.

2. The fuel injection device as in claim 1, wherein
   the injector is a two-way valve injector having a control chamber, which is applied with fuel supply pressure through an inflow passage and which is depressurized through a discharge passage, and an electromagnetic valve that opens and closes the discharge passage, the injector driving and controlling a needle by controlling the pressure inside the control chamber.

3. The fuel injection device as in claim 2, further comprising:

a calculating device that calculates in-cylinder valve opening pressure inside the control chamber, at which the needle starts lifting, based on the in-cylinder pressure obtained by the setting device and the injector individual data, wherein the correcting device calculates an in-cylinder variation correction value for the variation correction of the injector in consideration of the in-cylinder valve opening pressure.

4. The fuel injection device as in claim 3, wherein the correcting device calculates a variation correction value of a target injection amount in consideration of the in-cylinder valve opening pressure.

5. The fuel injection device as in claim 3, wherein the correcting device calculates a variation correction value of target injection timing in consideration of the in-cylinder valve opening pressure.

6. The fuel injection device as in claim 1, wherein the fuel injection device performs multi-injection of performing fuel injection in multiple times during one cycle.

7. The fuel injection device as in claim 3, wherein the fuel injection device performs multi-injection of performing fuel injection in multiple times during one cycle, and the calculating device calculates the in-cylinder valve opening pressure in consideration of a pulsation generated in the fuel supply pressure applied to the injector.

8. The fuel injection device as in claim 1, wherein the correcting device calculates an in-cylinder variation correction value for correcting variation in the injector by incorporating the in-cylinder pressure into the injector individual data.

9. The fuel injection device as in claim 8, wherein the injector is a two-way valve injector having a control chamber, which is applied with fuel supply pressure through an inflow passage and which is depressurized through a discharge passage, and an electromagnetic valve that opens and closes the discharge passage, the injector driving and controlling a needle by controlling the pressure inside the control chamber.

10. The fuel injection device as in claim 8, wherein the fuel injection device performs multi-injection of performing fuel injection in multiple times during one cycle.

* * * * *